Feb. 10, 1931.        J. ROBINSON         1,792,189
COUPLING HEAD LINER
Original Filed Feb. 9, 1922
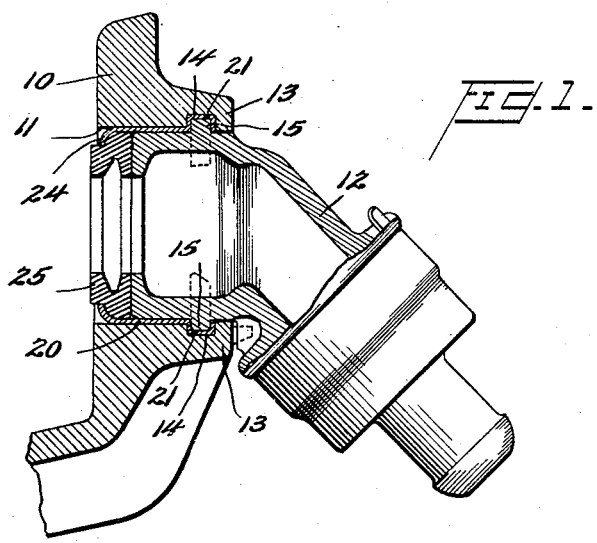
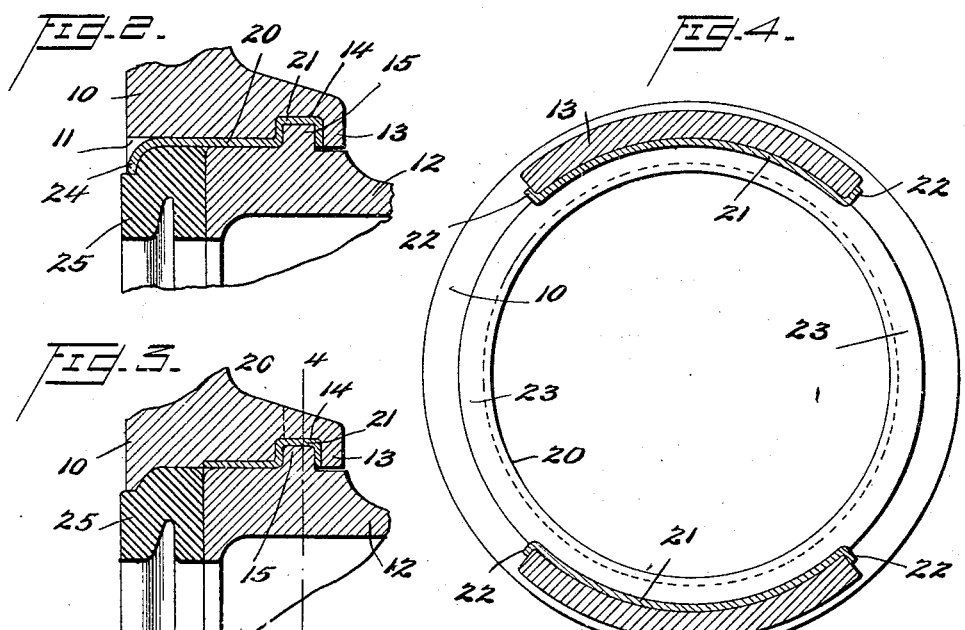

Patented Feb. 10, 1931

1,792,189

UNITED STATES PATENT OFFICE

JOSEPH ROBINSON, OF NEW YORK, N. Y.

COUPLING-HEAD LINER

Application filed February 9, 1922, Serial No. 535,279. Renewed April 2, 1928.

This invention relates to automatic train pipe connectors and particularly to certain improvements by which wear on the coupling heads is obviated.

In that class of automatic train pipe connectors in which the hose of the train pipes are provided with nipples or fittings detachably connected to the coupling head by bayonet or similar joints, it has been found that in service slight rotation or oscillation of the fittings relative to the head takes place. This oscillation causes wear of the parts particularly when corroded with rust. Such wear tends to cause leakage at the joints and in course of time necessitates discarding of the coupling head resulting in considerable loss. This invention aims to overcome such destruction of the heads. This result is accomplished by inserting a sleeve or lining of rust proof steel or other suitable material in each of the openings of the heads, such sleeves being arranged between the fittings and the walls of the openings and covering the portion of the head in which wear occurs. By this means wear on the parts of the head are prevented and whatever wear occurs takes place on the fittings or the sleeves which are comparatively inexpensive and can be easily replaced. Another advantage of the invention lies in the fact that sleeves of this kind can be carried forward toward the front face of the head and shaped to form a rust-proof seat for the gasket mounted in the head.

The invention in one specific embodiment is illustrated in the accompanying drawings, forming part of this specification and in which:

Figure 1 is a sectional view of part of a coupling head with a fitting mounted therein and showing a sleeve or lining between the fitting and walls of the head;

Figure 2 is an enlarged sectional view showing a part of the structure illustrated in Figure 1;

Figure 3 is a view similar to Figure 2 showing a slightly modified form of sleeve;

Figure 4 is an enlarged sectional view on the line 4—4 of Figure 3, the fitting being omitted and the entire opening in the head being illustrated; and Figure 5 is a broken side view of the sleeve such as shown in Figures 1 and 2.

In the drawings 10 represents a portion of a coupling head which is provided with a cylindrical opening 11 adapted to receive a fitting or nipple 12 secured to the train pipe hose. On opposite sides of the opening 11 the head is provided with rearwardly projecting portions or dogs 13, 13, in which grooves 14, 14 are formed, these grooves extending radially outwardly from the opening 11. These grooves are adapted to receive lugs 15, 15 on the fitting 12, the cooperating lugs 15, 15 and grooves 14, 14 forming means by which the fitting is held in the head. The rearwardly projecting portions 13, 13 of the head extend only part way around the opening 11 and the grooves 14, 14 are coextensive with such portions 13, 13. It will therefore be understood that the fitting 12 is connected to the head by inserting the same in the opening 11 and rotating it until the lugs 15, 15 lie in the grooves 14, 14.

This invention as already noted has for its object to prevent wear upon the head by the oscillation of the fittings, such as 12, in the openings of the head, this result being accomplished by inserting sleeves or linings between the fittings and the adjacent parts of the head. The drawings show such a sleeve applied to one opening in the head it being understood that a plurality of sleeves or linings may be used where the head is provided with a plurality of openings. As shown the sleeve or lining 20 is arranged in the opening 11 of the head and closely fits the wall of the opening. At its rear end the sleeve is provided with outwardly projecting portions or lugs 21, 21 which are shaped to fit and cover the walls of the grooves 14 of the head. The portions 21, 21 of the sleeve 20 are of less length than the space between the adjacent ends of the dogs 13, 13 of the head, so that the sleeve can be inserted in the head with the portions 21, 21 in line with the grooves 14, 14 and then rotated to move such portions of the sleeve into the grooves. This serves to lock the sleeve in the head. To effectively secure the sleeve in this position lugs 22 are formed on the ends of the portions 21 of the sleeve which lugs are bent into engagement with the parts 13, 13 of the head.

The sleeve 20 is also preferably provided at its rear end with a flange 23 which is adapted to contact with the portions of the head surrounding the rear end of the opening 11.

The sleeve 20 is made of rust-proof steel or other suitable material which is preferably harder than the material of the fitting 12. The sleeve therefore prevents wear on the parts of the head and any wear that occurs is largely localized on the fitting which can be easily and cheaply replaced when too much worn. The sleeve 20 may also be easily replaced when necessary. The rust-proof character of the sleeve tends to largely reduce the wear on the nipple 12 which is aggravated by the presence of rust and also tends to prevent fouling or rusting of the fitting in the head.

As shown in Figures 1 and 2 the front end 24 of the sleeve 20 may be bent inwardly toward its own axis to provide a seat for the usual gasket 25, this gasket being held against its seat by the front end of the fitting 12. This arrangement is particularly desirable since the sleeve 20, being made of non-corrosive material, forms a rust-proof seat for the gasket which prolongs the life of the gasket. If desired the sleeve 20 may be made shorter as shown in Figure 3 so as to terminate adjacent the front end of the fitting 12, the material of the head 10 adjacent the opening 11 being shaped to form a seat for the gasket 25.

Having thus described my invention what I claim as new and desire to secure by Letters Patent is:

1. A coupling head of the kind described having an opening, a fitting mounted in the opening, interlocking means on said fitting and head for removably securing said fitting in the head, said means including a lug on one of said parts and a groove in the other adapted to receive said lug, a sleeve arranged in said opening between said fitting and the walls of said opening, said sleeve being shaped to fit the portion of said interlocking means carried by the head.

2. A coupling head for train pipe connectors having an opening adapted to receive a fitting and also having a groove extending radially of said opening and part way around the circumference of the opening, a fitting having a lug adapted to be positioned within said groove by rotating said fitting within said opening, whereby the fitting is locked in the head, a sleeve arranged in said opening between the fitting and the walls of the opening and extending over the walls of said groove.

3. A coupling head for train pipe connectors having an opening and also having a groove extending radially of said opening and part way around the circumference of the opening, a fitting having a lug adapted to be positioned in said groove by rotating the fitting in said opening, and a liner of wear resisting material arranged in said groove.

4. A coupling head for train pipe connectors having an opening and also having a groove extending radially of said opening, a lug on said head forming the rear wall of said groove and extending part way around said opening, a sleeve arranged in said opening and groove and having parts bent into engagement with the ends of said lug whereby said sleeve is held in said opening.

5. A coupling head for train pipe connectors having an opening, dogs on said head arranged at opposite sides of said opening and extending part way around the opening, said head having oppositely arranged grooves extending radially from said opening adjacent said dogs, a sleeve mounted in said opening and extending over the walls of said grooves, said sleeve having portions engaging the ends of said dogs whereby said sleeve is held in said opening.

6. A coupling head for train pipe connectors having an opening, a sleeve arranged within said opening, the portion of said sleeve adjacent the coupling face of the head being shaped to form a seat for a gasket, said sleeve being adapted to receive a fitting for holding said gasket against said seat.

7. A coupling head for train pipe connectors having an opening, a sleeve arranged within said opening, a fitting arranged within said sleeve, the front end of said sleeve being bent inwardly toward the axis of the sleeve to form a seat for a gasket, and a gasket mounted in said seat and in front of said fitting.

8. A coupling head for train pipe connectors having an opening adapted to receive a fitting and having grooves extending radially outwardly from said opening to receive lugs on said fitting, a sleeve of wear-resisting rust-proof material arranged in said opening and having portions extending over the walls of said grooves, and means for securing said sleeve in said opening.

9. A coupling head for train pipe connectors having a cylindrical opening adapted to receive a fitting and also having rearwardly extending dogs on opposite sides of said opening, each of said dogs having a groove communicating with said opening and adapted to receive lugs on said fitting, a sleeve of wear resisting material having a cylindrical portion adapted to fit said opening and also having outwardly projecting portions adapted to fit said groove, and lugs on said sleeve for engaging the dogs on said head to hold said sleeve in said opening.

10. A coupling head for train pipe connectors having an opening, spaced dogs on said head adjacent the rear end of said opening, each of said dogs having a groove therein, a sleeve of relatively thin material having a portion adapted to fit said opening, and also having outwardly projecting spaced portions adapted to fit said grooves, said portions being of less length than the space between said dogs, whereby said sleeve may be inserted in said opening and rotated to move said portions into said grooves.

11. A coupling head for automatic train pipe connectors having an opening therethrough, a fitting mounted in said opening and movable therein, the front end of said fitting terminating short of the coupling face of the head, a gasket arranged in said opening in front of said fitting and a sleeve of relatively thin and hard rust-proof material arranged in said opening and surrounding said fitting and said gasket.

In testimony whereof I hereunto affix my signature.

JOSEPH ROBINSON.